(12) United States Patent
Sedlacek

(10) Patent No.: US 7,234,589 B2
(45) Date of Patent: Jun. 26, 2007

(54) CONVEYOR BELT AND MODULE WITH A SELF-ADJUSTING EDGE

(75) Inventor: Kyle J. Sedlacek, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/160,709

(22) Filed: Jul. 6, 2005

(65) Prior Publication Data

US 2006/0006050 A1    Jan. 12, 2006

Related U.S. Application Data

(60) Provisional application No. 60/521,807, filed on Jul. 6, 2004.

(51) Int. Cl.
*B65G 15/60* (2006.01)
(52) U.S. Cl. ............... 198/841; 198/840; 198/850; 198/851; 198/852; 198/853
(58) Field of Classification Search ............... 198/840, 198/841, 850, 852, 853, 851
See application file for complete search history.

(56) References Cited

U.S. PATENT DOCUMENTS

| 4,222,483 | A | | 9/1980 | Wootton et al. | 198/831 |
|---|---|---|---|---|---|
| 5,280,833 | A | | 1/1994 | Robin | 198/831 |
| 5,738,205 | A | * | 4/1998 | Draebel | 198/852 |
| 5,775,480 | A | * | 7/1998 | Lapeyre et al. | 198/831 |
| 5,779,027 | A | | 7/1998 | Ensch et al. | 198/841 |
| 5,782,340 | A | | 7/1998 | Dolan | 198/841 |
| 6,073,756 | A | * | 6/2000 | Damkjaer et al. | 198/853 |
| 6,216,854 | B1 | | 4/2001 | Damkjaer et al. | 198/853 |
| 6,471,046 | B2 | * | 10/2002 | Layne et al. | 198/831 |
| 6,578,704 | B1 | * | 6/2003 | MacLachlan | 198/778 |
| 2003/0116403 | A1 | * | 6/2003 | Fargo et al. | 198/330 |

* cited by examiner

*Primary Examiner*—Gene O. Crawford
*Assistant Examiner*—Leslie A. Nicholson, III
(74) *Attorney, Agent, or Firm*—James T. Cronvich

(57) ABSTRACT

A modular conveyor belt with a self-adjusting edge for bearing against a conveyor side rail. An edge pad, which can be made of a durable material for long wear life, pivotably attaches to the side edge of a belt row. The pivotable attachment allows the pad to adjust itself to maximize its contact area with the side rail.

20 Claims, 5 Drawing Sheets

CONVEYOR BELT AND MODULE WITH A SELF-ADJUSTING EDGE

CROSS REFERENCE

This application claims the benefit of U.S. Provisional Patent Application No. 60/521,807, filed Jul. 6, 2004.

BACKGROUND

This invention relates generally to power-driven conveyors and, more particularly, to modular conveyor belts that engage a conveyor side rail as they advance along a conveying path.

Modular conveyor belts are constructed of a series of rows of belt modules linked by hinge pins through the interleaved hinge eyes of consecutive rows. Conveyor belts are supported in a conveyor frame that defines the belt's conveying path. In some applications, the conveying path includes turns. Modular belts that can negotiate turns typically bear against a side rail at the inside of the turns as the belt advances. The inside edge of the belt rubs on the side rail. Usually the side rail provides a vertical surface against which the parallel vertical side edge of the belt can bear. But, in many situations, the side edge of the belt at the inside of a turn is not parallel to the vertical side rail. If the plane of the belt at the inside edge is not aligned perpendicular to the side rail, the contact between the side rail and the edge of the belt is not distributed across the entire side edge of the belt. Instead, only a corner of the belt's inside edge contacts the side rail. The concentrated force at the corner digs into and scores the side rail. The friction heats the belt at the edge and, especially in the case of plastic belts, causes the belt material to deteriorate, which shortens the belt's useful lifetime.

Thus, there is a need to prevent modular conveyor belts from prematurely aging because of the misalignment of the bearing edge of a conveyor belt relative to a conveyor side rail.

SUMMARY

This need and other needs are satisfied by a modular conveyor belt embodying features of the invention. In a first version, a series of rows of belt modules are hingedly interconnected end to end to form a conveyor belt that extends in a lateral direction from a first side edge to a second side edge. A bearing member is attached pivotably to the first side edge.

In another aspect of the invention, a modular conveyor belt is made up of a series of rows of belt modules hingedly interconnected end to end. The belt extends laterally from a first side edge to a second side edge and each row generally defines a plane. A bearing member pivotably attached to the first side edge of a row includes an outer bearing surface whose orientation is variable relative to the plane of the row.

In yet another aspect of the invention, an edge module for a modular conveyor belt comprises a module body extending longitudinally from a first end to a second end, laterally from a first side edge to a second side edge, and in thickness from a top to a bottom. Hinge eyes extend longitudinally from the first and second ends. A bearing member is pivotably attached to the first side edge of the module.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
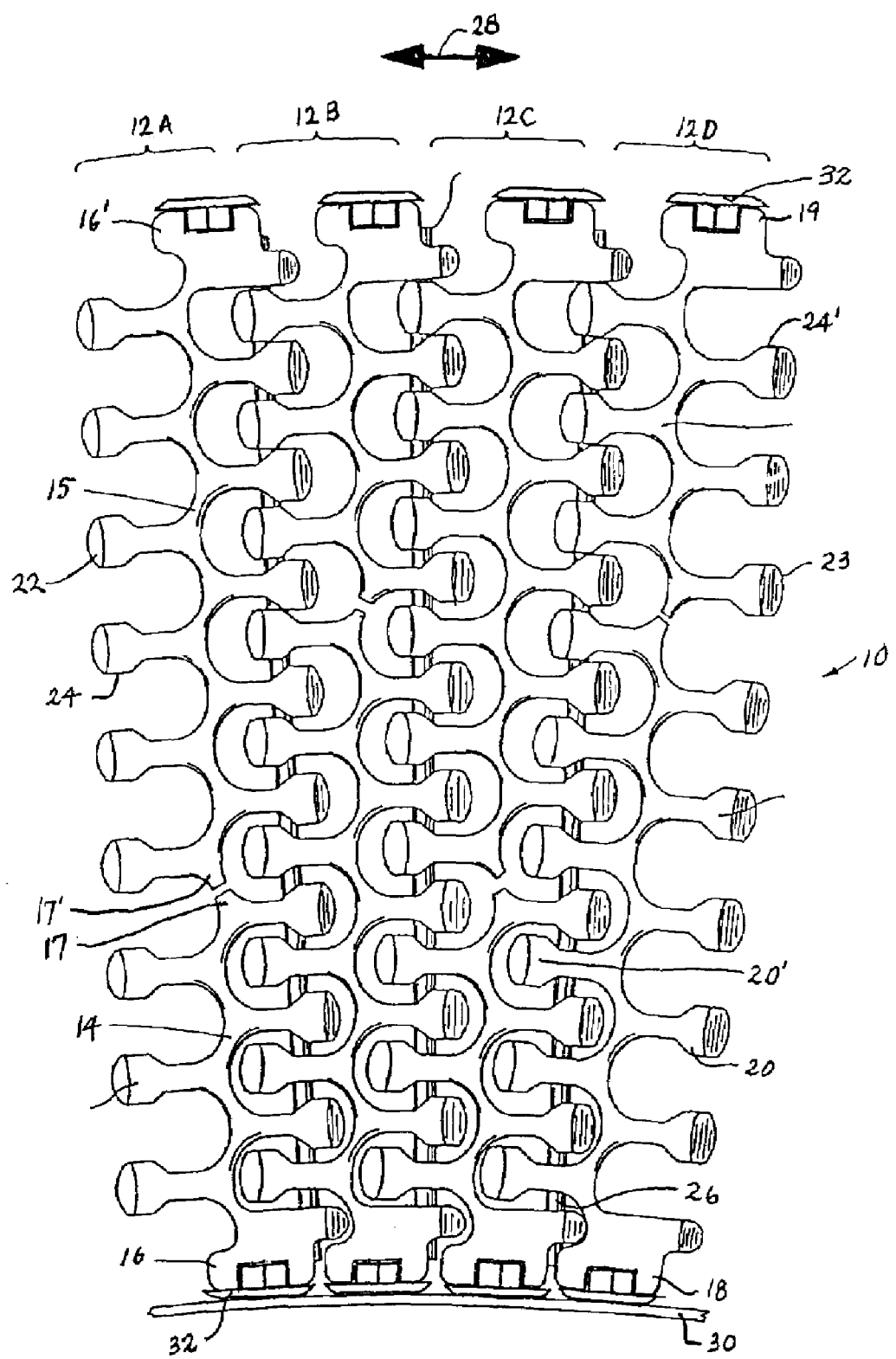
FIG. 1 is a top plan view of a portion of a modular conveyor belt embodying features of the invention.

A portion of a modular conveyor belt embodying features of the invention is shown in FIG. 1 in a turn segment of a conveying path. The belt 10 is constructed of rows 12A–12D of one or more belt modules (in this example, two modules per row: a short edge module 14 and a long edge module 15) arranged side by side. Each edge module extends from an outer side 16, 16' to an interior side 17, 17'. The outer sides form the first and second side edges 18, 19 of the belt. Hinge eyes 20, 20' are spaced apart laterally along first and second ends 22, 23 of each row. Aligned openings 24, 24' in the interleaved hinge eyes of consecutive rows receive a hinge pin 26 that links the rows together into an endless belt capable of articulating about drive and idler sprockets or drums. To enable the belt to collapse at the inside of a turn, the openings 24 in the hinge eyes along the first end 22 are slotted in the direction of belt travel 28. The openings 24' at the second end 23 may be circular in cross section. Of course, for a belt that need not follow a curved conveying path, elongated hinge rod openings are not necessary.

A modular belt of any desired width can be constructed by adding internal modules between the side edge modules 14, 15. Internal modules would typically be similar in structure, but without the outside edge structure 16, 16' of the edge modules. The modules are conventionally arranged in a bricklay pattern for strength. Preferably, the modules are formed of a thermoplastic polymer, such as polyethylene, polypropylene, or acetal in an injection molding process. Modular belts of this sort are available from, for example, Intralox, L.L.C., of Harahan, La., USA.

As shown in FIG. 1, the belt 10 is traveling in a turn along a conveying path. Because the path at the inside of a turn is shorter than the path at the outside of the turn, a conveyor belt designed to operate in turns must be able to adjust to the differences in path lengths across the width of the belt. The elongated hinge rod openings in the second set of hinge eyes allow the belt 10 to collapse at the inside of the turn. In the turn, the belt is also pulled against a side rail 30 mounted in a conveyor frame. Rubbing contact between the side of the belt and the side rail generates a great deal of friction. Bearing members in the form of pads 32 pivotably attached to the outer sides 16, 16' of the edge modules protect the sides of the belt from the effects of friction; namely, accelerated wear due to abrasion or to degradation of the plastic material of the edge module from continual heating. The pads are preferably made of a durable material, such as carbon steel, stainless steel, or nylon, as some examples.

Figure 2A:
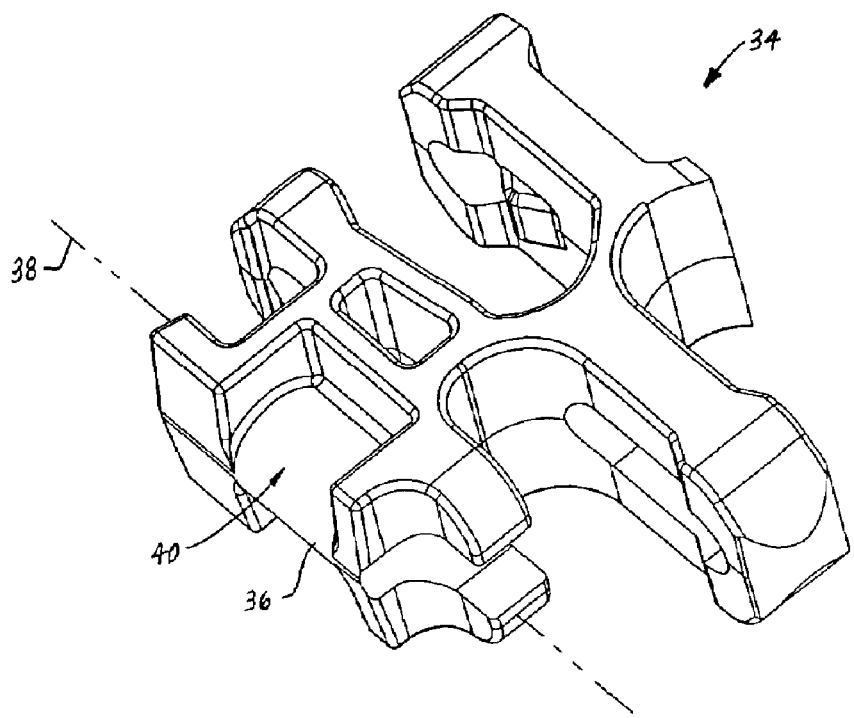
FIG. 2A is an isometric view of an edge portion of an edge module usable in a belt as in FIG. 1 without an edge pad.
Figure 2B:
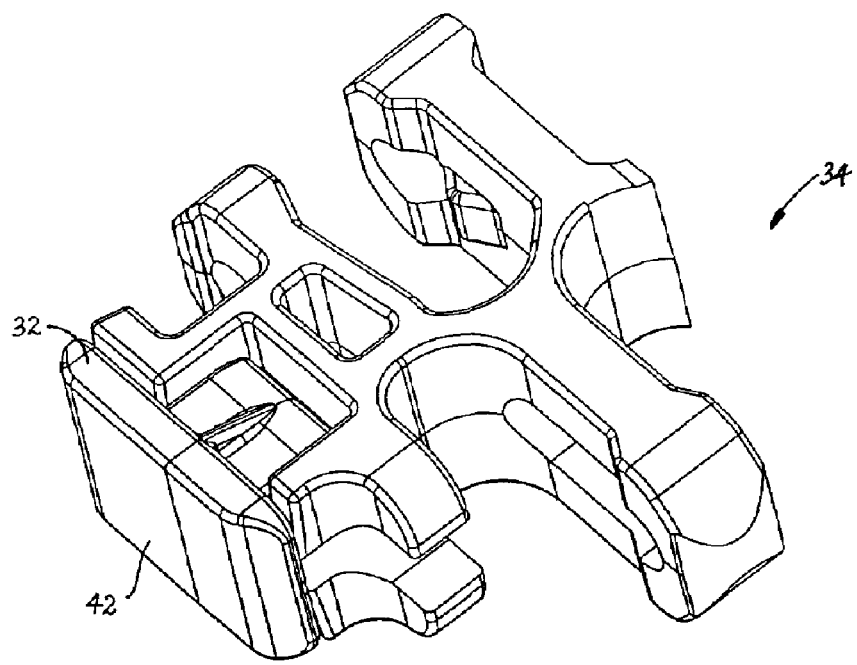
FIG. 2B is an isometric view as in FIG. 2A with an edge pad in place.
Figure 3A:
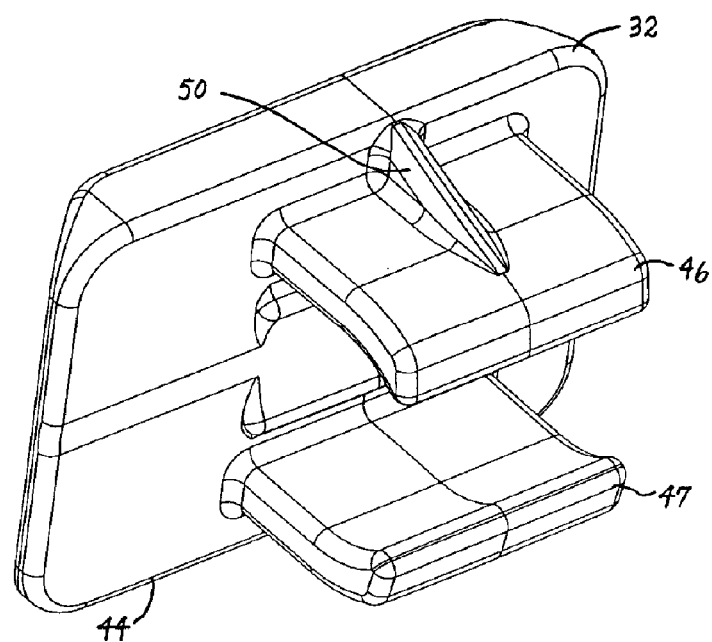
FIGS. 3A and 3B are isometric and front elevation views of an edge pad as in FIG. 2B.
Figure 3B:
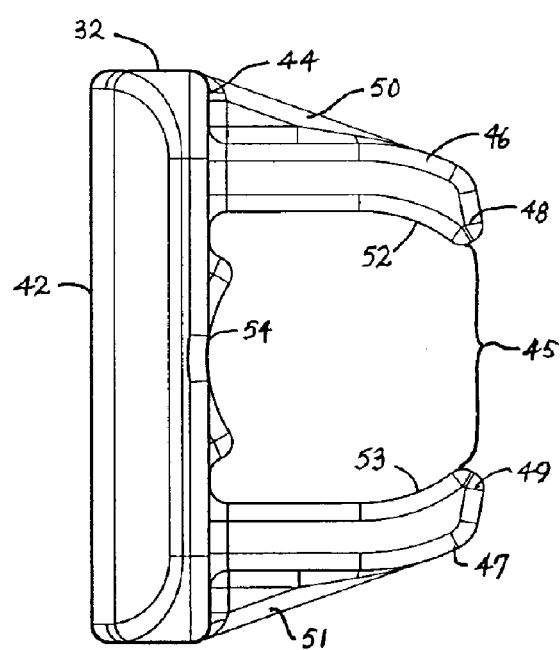

The outside edge portion of one version of an edge module in a row is shown in more detail in FIGS. 2A and 2B. The structure of this edge module 34 differs slightly from that shown in FIG. 1, but functions similarly. As best seen in FIG. 2A, an axle 36 in the shape of a cylindrical barrel with a long axis 38 in the longitudinal direction of the module is formed in a recess 40 at the outside edge of the module body. A pad 32 (FIG. 2B) clips onto the axle, about which the pad can rotate over a limited range. As shown in FIGS. 3A and 3B, the pad includes an outer bearing surface 42 and an opposite inner side 44. Two arms 46, 47 extend from the inner side and terminate at their distal ends in hook portions 48, 49 to form a collar open across a throat 45. Struts 50, 51 add support to the arms. Curved surfaces 52, 53 on the inner sides of the collar and a curved surface 54 on the inner side of the pad are shaped to rotatably receive the axle 36 on the edge module. The pad snaps onto the axle through the throat of the collar. The hook portions retain the pad on the axle. The curved surfaces on the pad ride around the outer surface of the axle to vary the orientation of the pad relative to the plane of the edge module.

Figure 4:
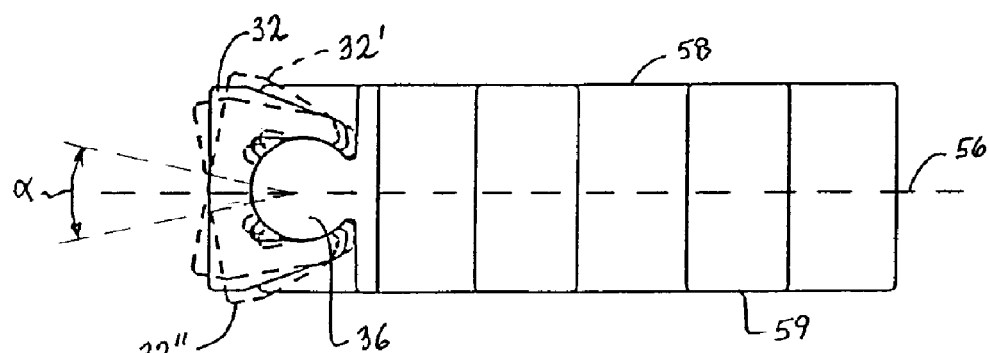
FIG. 4 is an elevation view of a side edge of a belt module as in FIG. 2B showing the range over which the edge pad can swivel.
Figure 5A:
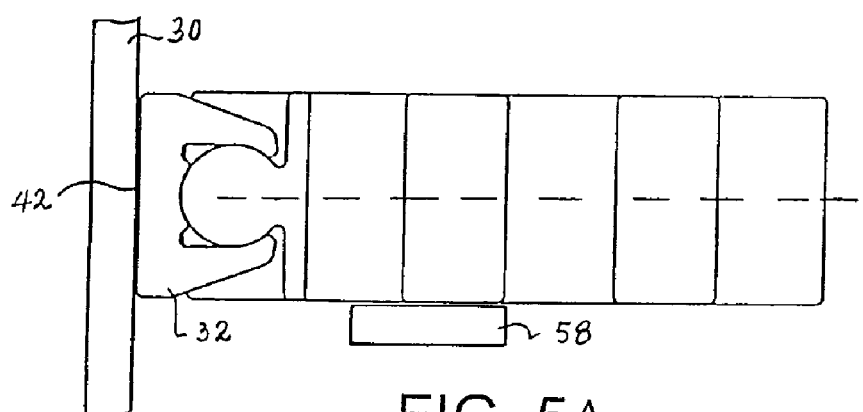
FIG. 5A is an elevation view of the inside edge portion of a conveyor as in FIG. 1.
Figure 5B:
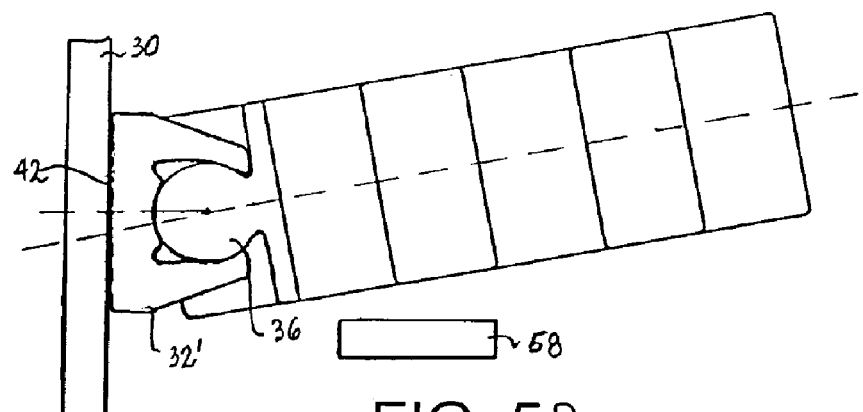
FIG. 5B is an elevation view as in FIG. 5A with the edge portion of the belt lifted out of its preferred position.

The range of rotation of the pad 32 relative to the module 34 is shown in FIG. 4, in which the plane of the module is represented generally by its lateral centerline 56, midway between the top 58 and bottom 59 of the edge module. The pad can rotate up to a first position 32' about the axle 36 and down to a second position 32". The angular range of rotation α is symmetrical about the centerline in this example, but could be asymmetrical as well. FIG. 5A depicts the edge of a belt supported below on a wearstrip 58. The outer bearing surface 42 of the pad 32 bears against the conveyor side rail 30. In the ideal conveying situation depicted in FIG. 5A, the bearing surface is generally perpendicular to the plane of the edge module. But it sometimes happens that, as a belt makes it way around a turn, the outside of the belt tends to rise up out of the conveyor frame, as shown in FIG. 5B. The plane of the belt in that situation is no longer perpendicular to the face of the rail. But the pad is able to swivel about the axle so that the bearing surface 42 maximizes its contact area with the side rail. As the plane of the belt changes relative to its ideal horizontal orientation, the swivel pad always assumes the position of maximum contact with the rail. In this way, the pad is self-adjusting.

Figure 6:
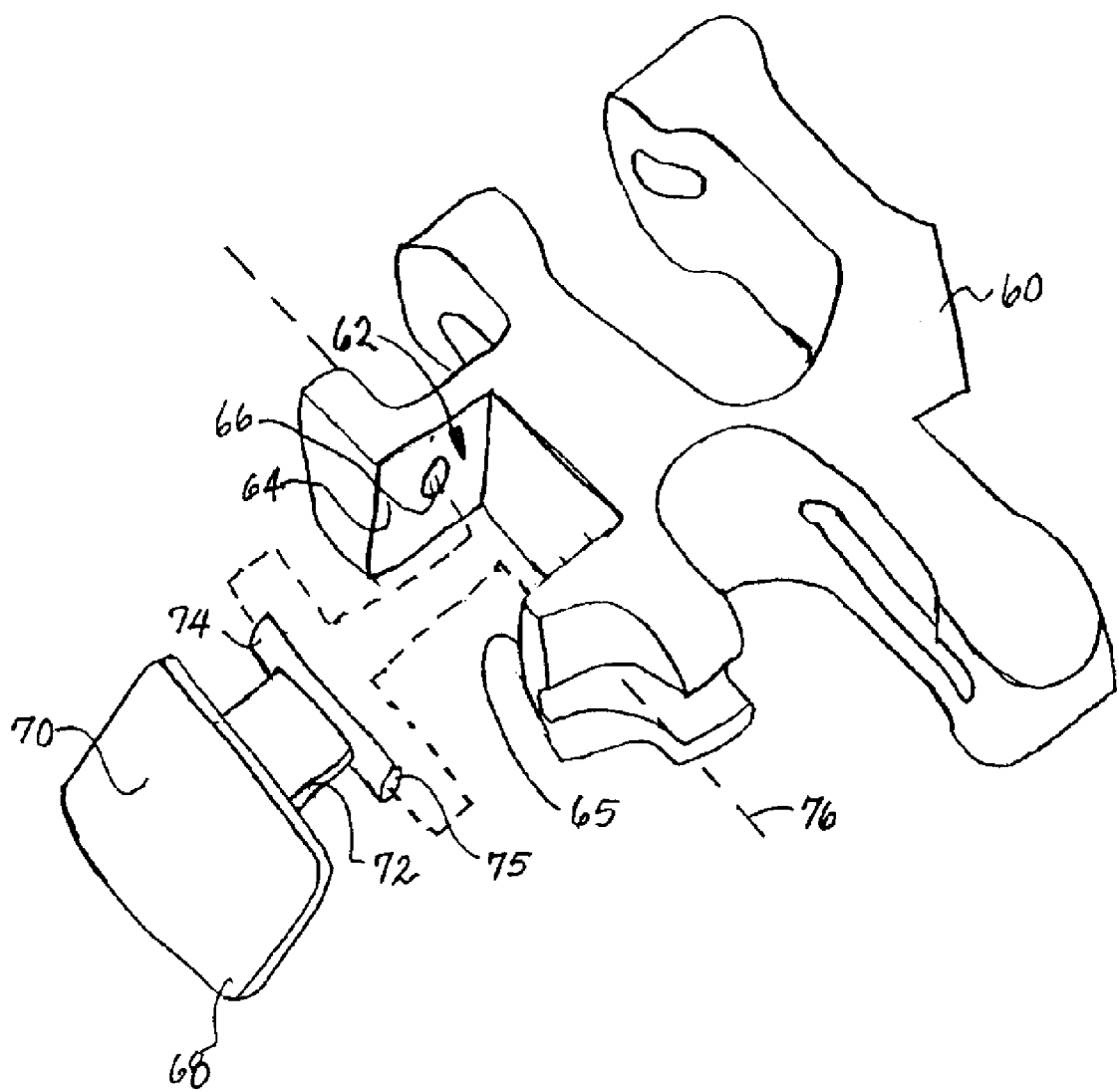
FIG. 6 is an isometric view of another version of a side edge usable in a belt as in FIG. 1 and featuring an edge pad with a stub for attaching to an edge module.

Another version of the swivel pad is shown in FIG. 6. In this version, an edge module 60 has an outside recess 62. Opposite walls 64, 65 bounding the recess have receptacles 66 formed in them. A pad 68 with an outer bearing surface 70 has a leg 72 extending from its inner side terminating in stubs 74, 75 that are received in the receptacles. In this way, the pad can rotate about a longitudinal axis 76 defined by the longitudinally aligned receptacles.

Thus, the invention has been described in detail with respect to a few preferred versions. But other versions are possible. For example, the joint between the pad and the edge module could be a ball and socket, which would allow the pad to swivel about multiple axes rather than just the single axis of the depicted versions. As another example, the pads need not necessarily be attached on every row or on both sides of the belt. Consequently, as these examples suggest, the scope of the invention is not meant to be limited to the details of the versions described in detail.

What is claimed is:

1. A modular conveyor belt comprising:
    a series of rows of belt modules hingedly interconnected end to end in a direction of belt travel to form a conveyor belt extending in a lateral direction, perpendicular to the direction of belt travel, from a first side edge to a second side edge;
    a bearing member pivotably attached to the first side edge and including an outer bearing surface whose orientation is variable only over a predetermined range of angles as the bearing member pivots.

2. A modular conveyor belt as in claim 1 further comprising a second bearing member pivotably attached to the second side edge of the conveyor belt.

3. A modular conveyor belt as in claim 1 wherein each row comprises a first edge module at the first side of the belt, the first edge module including an axle in the direction of belt travel and wherein the bearing member includes a pad forming the outer bearing surface on an outer side and an open collar on an opposite inner side rotatably retained on the axle.

4. A modular conveyor belt as in claim 1 wherein each row comprises a first edge module at the first side of the belt, the first edge module including a recess opening onto the first side edge of the belt flanked by opposite recess walls forming receptacles in each wall and wherein the bearing member includes a pad forming the outer bearing surface on an outer side and an arm extending from an opposite inner side and terminating in oppositely directed stubs that are rotatably received in the receptacles.

5. A modular conveyor belt as in claim 1 wherein the bearing member includes snap-fit means for attaching to the first side edge.

6. A modular conveyor belt as in claim 1 wherein the bearing member is made of a more durable material than the conveyor belt.

7. A modular conveyor belt as in claim 1 wherein the bearing member pivots about an axis in the direction of belt travel.

8. A modular conveyor belt comprising:
    a series of rows of belt modules hingedly interconnected end to end in a direction of belt travel to form a conveyor belt extending in a lateral direction, perpendicular to the direction of belt travel, from a first side edge to a second side edge, wherein each row generally defines a plane;
    a bearing member pivotably attached to the first side edge of a row and including an outer bearing surface whose orientation is variable only over a predetermined range of angles relative to the plane of the row.

9. A modular conveyor belt as in claim 8 further comprising a second bearing member pivotably attached to the second side edge of the conveyor belt.

10. A modular conveyor belt as in claim 8 wherein each row comprises a first edge module at the first side of the belt, the first edge module including an axle in the direction of belt travel and wherein the bearing member includes a pad forming a bearing surface on an outer side and an open collar on an opposite inner side rotatably retained on the axle.

11. A modular conveyor belt as in claim 8 wherein each row comprises a first edge module at the first side of the belt, the first edge module including a recess opening onto the first side edge of the belt flanked by opposite recess walls forming receptacles in each wall and wherein the bearing member includes a pad forming the outer bearing surface on an outer side and an arm extending from an opposite inner side and terminating in oppositely directed stubs that are rotatably received in the receptacles.

12. A modular conveyor belt as in claim 8 wherein the bearing member includes snap-fit means for attaching to the first side edge.

13. A modular conveyor belt as in claim 8 wherein the bearing member is made of a more durable material than the conveyor belt.

14. A modular conveyor belt as in claim 8 wherein the bearing member pivots about an axis in the direction of belt travel.

15. An edge module for a modular conveyor belt comprising:
- a module body extending in a longitudinal direction in a direction of belt travel from a first end to a second end, in a lateral direction, perpendicular to the longitudinal direction, from a first side edge to a second side edge, and in thickness from a top to a bottom;
- hinge eyes extending in the longitudinal direction from the first and second ends; and
- a bearing member pivotably attached to the first side edge of the module and including an outer bearing surface whose orientation is variable only over a predetermined range of angles as the bearing member pivots.

16. An edge module as in claim 15 further comprising a longitudinal axle at the first side edge of the module body to which the bearing member is rotatably attached.

17. An edge module as in claim 15 further comprising a recess opening onto the first side edge of the module flanked by opposite recess walls forming receptacles in each wall and wherein the bearing member includes a pad forming the outer bearing surface on an outer side and an arm extending from an opposite inner side and terminating in oppositely directed stubs that are rotatably received in the receptacles.

18. An edge module as in claim 15 wherein the bearing member includes snap-fit means for attaching to the first side edge.

19. An edge module as in claim 15 wherein the bearing member is made of a more durable material than the edge module.

20. An edge module as in claim 15 wherein the bearing member pivots about an axis in the longitudinal direction.

* * * * *